April 14, 1970  W. J. ROSS ET AL  3,506,367
SPECTROPHOTOMETER CELLS
Filed July 20, 1966
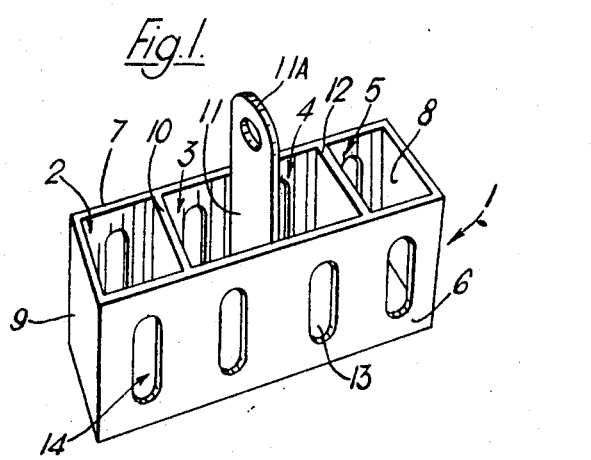
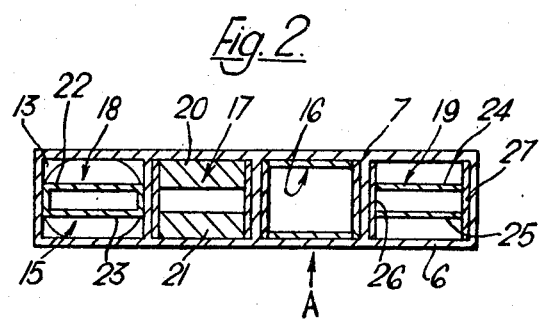
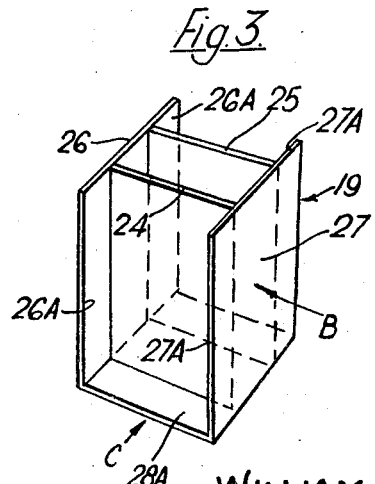
Inventors
WILLIAM J. ROSS &
STANLEY G. WATSON
By Mason, Fenwick & Lawrence
Attorneys United States Patent Office 3,506,367
Patented Apr. 14, 1970

3,506,367
SPECTROPHOTOMETER CELLS
William J. Ross, 55 Arden St., Edinburgh 9, Scotland, and Stanley G. Watson, 27 Castallan Ave., Gideapark, Romford, England
Filed July 20, 1966, Ser. No. 566,559
Claims priority, application Great Britain, Dec. 28, 1965, 54,990/65
Int. Cl. G01n 21/00, 21/26
U.S. Cl. 356—246      1 Claim

ABSTRACT OF THE DISCLOSURE

A spectrophotometer cell of rectangular cross section internally and externally and fitting neatly widthwise into a square compartment of a cell carrier, has all its walls transparent, and is provided with external flanges on at least one of its minor walls, so that the cell may be withdrawn and turned through 90°, and then be fitted neatly into the compartment in order to provide a different length of light path.

---

This invention relates to spectrophotometer cells or cuvettes, hereinafter refered to as cells.

The cells of a spectrophotometer are box-shaped and, in use, stand upright on one end in correspondingly shaped compartments of a cell carrier. The width and breadth of each cell externally in cross section is such that the cell fits neatly but withdrawably into its compartment. For convenience of description, the width will be assumed to be the distance from side to side of the cell, and the breadth will be assumed to be the distance front to rear of the cell, the front and rear walls being the walls through which the light beam passes. Cells of different internal breadth are required, as the internal breadth of one cell may be too great for some liquids to allow sufficient light to pass through.

Generally, at present, cells of the greatest required internal breadth, for example 10 mm. approximately, are made with thin front, rear and side walls for example about 1 mm. thick, and cells of shorter breadth, for example 1 mm., are made with front and rear walls which are thicker so that the internal width is reduced while the external width remains the same as the cell having a greater internal width so that the cell still fits neatly into its compartment in the carrier. This has the disadvantage that the cost of the cell is increased due to the use of the thicker material for the front and rear walls, and the use of thicker walls may be optically detrimental.

In some cases, however, cells of shorter internal width are made with thin front and rear walls so that their external width is less than the internal width of the carrier compartment, and the cell therefore does not fit neatly into the compartment. In other words, the cell is such a loose fit in the compartment that it is not properly supported. If such a cell is used, this has the disadvantage that the operator has to use any available packing material to fill the gaps between the front and rear walls of the cell and of the carrier compartment, and, as the cell has to lie vertically and square to the light beam, this may easily result in inaccuracies.

An object of the present invention is to provide a cell in which the disadvantages aforesaid are avoided or reduced.

According to the present invention we provide, for use in a compartment of a spectrophotometer cell carrier of predetermined internal breadth, a spectrophotometer cell having an external breadth less than said predetermined breadth, and means projecting breadthwise externally from said cell to an extent such that the overall breadth of the cell is equal to said predetermined breadth.

For convenience, in the immediately preceding paragraph and in the appended claim, no account has been taken of working clearances, and it will be understood that the difference in breadth between the internal breadth of the compartment and the external breadth of the cell is more than a working clearance, and that the overall breadth of the cell will not be exactly equal to the internal breadth of the compartment but that there will be a working clearance.

Further, according to the present invention we provide, in combination, a spectrophotometer cell carrier having a compartment of square or rectangular cross section, and a spectrophotometer cell in said compartment, said cell being of rectangular cross section and having an external breadth less than the internal breadth of the compartment, and means projecting breadthwise externally from the cell so that the overall breadth of the cell is a neat fit in the compartment.

Preferably, the side walls and the bottom wall of the cell are extended so as to form said projecting means.

Preferably also, each wall of the cell is approximately 1 mm. thick.

Preferably also the side walls as well as the front and rear walls of the cell are transparent, and the overall breadth of the cell is the same as the overall width so that, in a compartment of correspondingly square cross section, a rectangular cell can be used turned through 90° about its vertical axis so as to provide a light path of different length through the cell.

An embodiment of the invention will now be described, by way of example, with reference to the accompanying drawings, in which:

FIG. 1 is a perspective view of known carrier,

FIG. 2 is a sectional plan view corresponding to FIG. 1 and showing four cells in the carrier, one of the cells being an embodiment according to the present invention, and the other three cells benig of a previously known type, and FIG. 3 is a perspective view of one embodiment of a cell according to the present invention.

Referring to the drawings, FIG. 1 shows a cell carrier 1. The carrier 1 has four compartments, 2, 3, 4, 5 defined by front and rear walls 6, 7, side walls 8, 9, partition walls 10, 11, 12 and a bottom wall 13. The front and rear walls 6, 7 have directly opposed apertures 14 through which the light beam passes into and out of the compartments, and the partition 11 is upwardly extended and forms a handle 11A, and the base of each compartment has a large circular hole 15 to accommodate cells of the flow-through type. In the present embodiment, each compartment is square in cross section internally.

Reference is now made to FIG. 2, in which four cells 16, 17, 18 and 19 are shown in the compartments of the carrier, the cells 16, 17 and 18 being of a known type. The cell 16 is square internally in cross section and has thin walls each approximately 1 mm. thick so that the column of liquid in the cell is relatively broad, that is to say from front to rear in the direction of the arrow A. If this column of liquid is too broad, the cell 16 or 17 each of which is of shorter breadth internally has to be used. The internal breadth of the cell 16 may, for example, be 10 mm., and that of the cells 17 and 18 may be anything from above zero upwards to less than 10 mm. The cell 17 has front and rear walls 20, 21 so that it has the same external breadth as the cell 16 and is a neat fit in the compartment. The cell 18, however, has thin front and rear walls 22, 23 and is unsupported by the front and rear walls 6, 7 of the carrier 1, so that it has to be packed in position as previously mentioned.

The cell 19 which is an embodiment in accordance with the present invention is also of relatively short breadth compared to the cell 16 and has thin front and rear walls 24, 25 as in the cell 18. The cell 19 also has side walls 26, 27 which are of the same breadth as the side walls of the cell 16. That is to say, the cell 19 has portions 26A, 27A which project breadthwise of the cell and are formed by extensions of the side walls 26, 27 so that the overall breadth of the cell is such as to be a neat fit in the compartment. The cell 19 is thus a neat fit in its compartment without the use of thick front and rear walls and without the use of packing as was required hitherto.

In the embodiment described, the cell 19 also has portions 28A at the front and rear corresponding to the projections 26A, 27A and formed by extensions of the bottom wall of the cell 16.

From the above, it will be seen that the cell 16 overcomes the disadvantages aforesaid of the previously known cells 17 and 18, and it can be made more cheaply than the cell 17, and can be made in a fully fused construction.

A further important advantage of the cell 19 is that, for use in a carrier having compartments of square cross section which is the standard form of carrier, the cell is, of course, made correspondingly square. That is to say, the overall breadth of the cell, including the extensions 26A, 27A, 28A is the same as the overall width of the cell. The cell 19 is therefore made with transparent side walls 26, 27 so that the cell can be used with a beam of light passing through it in either of the directions indicated by the arrows B and C in FIG. 3. Thus, if the cell is used with the beam of light passing though it in the direction of the arrow B, and the length of the path through the column is found to be too long because of the degree of opacity, the cell can be withdrawn and be reinserted turned through 90° about its vertical axis so as to provide a shorter light path through the liquid in the cell in the direction of the arrow C.

Various modifications may be made without departing from the scope of the invention as defined in the appended claim. For example, for the purposes of the invention, the extensions 26A, 27A could be omitted, or the extensions 28A could be omitted, or the extensions 26A and 28A or 27A and 28A could be omitted.

It is also possible that the cell shown in FIG. 3 could be used to mount an additional cell such as cell 18 if the latter were of the correct width to fit neatly between flanges 26A, 27A. In this way, a second alternative length of light path through the liquid could be provided.

It will be understood that the extensions or projections need not be continuous from top to bottom or from side to side of the cell, but may be replaced, for example, by fingers, but continuous extensions are preferred for reasons of strength and ease of manufacture, and for the same reasons the FIG. 3 embodiment is preferred.

We claim:
1. In a spectrophotometer cell which has transparent opposed front and rear walls and transparent opposed side walls, and a base wall, and which is of rectangular cross section internally and externally with the front and rear walls forming the major walls and the base and side walls forming the minor walls; and is of a predetermined external breadth from front to rear and a predetermined external width from side to side; the improvement consisting in that said base and said side walls have extensions projecting forwardly and rearwardly which together with said base and side walls have a breadth equal to said predetermined external width, whereby said cell may be fitted into a square compartment of a spectrophotometer cell carrier to provide a relatively short light path through the major front and rear walls, or may be fitted, turned through 90°, to provide a relatively long light path through the minor side walls, and a further length of light path may be obtained by fitting a further rectangular cell into one of the recesses defined by said extensions and one of the major walls.

References Cited

UNITED STATES PATENTS 3,027,799   4/1962   Weichselbaum.

OTHER REFERENCES

Müller, R. H., Photoelectric Methods in Analytical Chemistry, Ind. & Eng. Chem., Analytical ed., 11 (1), January 1939, pp. 1–4.

A Simple Anaerobicell For the Beckman Spectrophotometer, McCormick et al., Anal. Chem., 33, (1), January 1961, p. 157.

A Thermostat For Light Scattering Measurements, Casassa et al., J. Polymer Sci., XIV, p. 385–9 (1954).

Cylindrical Light Scattering Cell, Witnauer et al., Rev. Sci. Instr. 23, (2), p. 99–100, February 1952.

Phoenix Precision Inst. Co. Data #156 Sheet-Absorbtion Cells, 2 pages, Rec'd Pat. Ofc. Sci. Lib., Feb. 28, 1958.

Optical Absorbtion Cells by Optical Co. Inc., Bulletin, #65, 3 pages, pp. 3, 7, and Price Sheet, Dec. 1, 1964.

RONALD L. WIBERT, Primary Examiner

R. J. WEBSTER, Assistant Examiner